M. A. BELLIVEAU.
COMBINATION CARRIAGE AND SLED.
APPLICATION FILED DEC. 27, 1915.
1,205,842.
Patented Nov. 21, 1916.
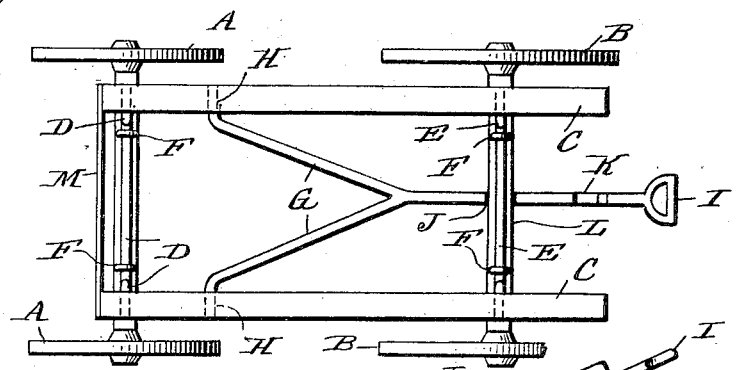
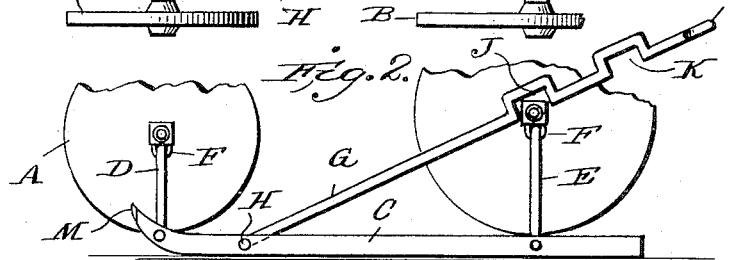
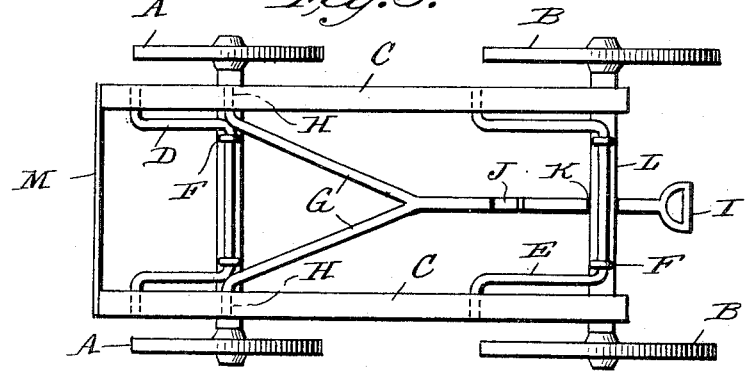
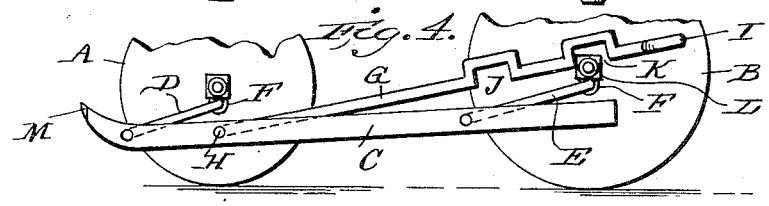

UNITED STATES PATENT OFFICE.

MELAS A. BELLIVEAU, OF LYNN, MASSACHUSETTS.

COMBINATION CARRIAGE AND SLED.

1,205,842.

Specification of Letters Patent.  Patented Nov. 21, 1916.

Application filed December 27, 1915. Serial No. 68,638.

*To all whom it may concern:*

Be it known that I, MELAS A. BELLIVEAU, a citizen of the United States, residing at Lynn, in the county of Essex and Commonwealth of Massachusetts, have invented certain new and useful Improvements in Combination Carriages and Sleds, of which the following is such a specification as will enable others well versed in the art to which it appertains to make and use the same.

My invention relates to combined runner and wheeled vehicles, and has for its objects to provide a means by which a runner device may be more simply and more economically built upon, or added to, a wheeled vehicle than has heretofore been possible, to provide a new and simple means of changing the vehicle from wheels to runners and vice versa, without necessity of resorting to levers, cranks, lifting cogs, or other complicated and expensive devices, and to provide other advantages and results some of which are referred to in connection with the following detailed description.

I have in working out the details of my construction applied my experiments to the building and operating of combination wheeled and sledded baby carriages as illustrated in the accompanying drawings. It will of course be understood, that the apparatus may be made in such sizes and of such strength as may be required for any vehicle.

Referring to the said accompanying drawings, which form a part of this specification: Figure 1, shows a bottom view of my device looking up from under the wheels, with the runners in position so as to rest upon the ground. Fig. 2, shows a side view of my device with said runners in position so as to rest upon the ground. Fig. 3, shows a bottom view of my device looking up from under the wheels, with the runners drawn up and away from the ground. Fig. 4, shows a side view of my device with said runners drawn up and away from the ground.

Similar reference letters indicate similar parts, throughout the several views.

Referring again to Fig. 1, "A" shows the fore wheels of the carriage, "B" shows the rear wheels of said carriage, "C" shows the runners, which in Figs. 1 and 2 are lowered in position below the wheels "A" and "B", so as to rest upon the ground, and raise the wheels from the ground. "D" shows the supporting arm from the front axle to the runners "C", "E" shows the supporting arm from the rear axle to the runners "C". The arms "D" and "E" are U-shape in form, the opposite ends being bent outwardly to form runner supports which are secured in transverse opening formed through the runners "C", on opposite sides of the vehicle, and having their horizontal connecting portions so hinged to the underside of the axles at "F", by passing through holding eyes, as to allow a swinging motion of the runners "C", backward or forward as the requirements may be. "G" shows the operating arm, the lower end of which is V-shape in form so as to allow its being hinged or pivoted also in transverse intermediate openings formed through opposite runners at "H". The upper end of the operating arm is provided with a handle "I". Intermediate its ends the arm "G" is provided with two holding notches "J" and "K" either of which fits over the rear axle "L", thus securely holding the arm "G" at the point placed, and controlling accordingly the location of the runners "C" as they are raised or lowered in use. The runners "C" are connected by the rod "M". In operation, the runners "C" are held in position away from the ground by placing the notch "K" over the axle "L". In lowering the runners the notch "K" is lifted from the axle "L", the weight of the runners "C" then carries them to the ground, leaving the holding arm "G" resting upon the axle at a point intermediate the notches "J" and "K". By then placing one foot upon the rod "M" so as to hold it upon the ground and pulling the carriage forward with the hands the wheels are raised from the ground. As the rods "D" and "E" assume a vertical position the notch "J" falls into position over the axle "L" and holds the runners in position. In raising the runners the notch "J" is raised from the axle "L", the body of the carriage is then pulled backward so as to allow the wheels to reach the ground, the handled arm "G" is then pushed forward till the notch "K" fits upon the axle "L" and holds the runners "C" away from the ground in position between the wheels.

The extreme simplicity of my device, the inexpensive manner in which it is manufactured and applied, and the ease with which it is operated all commend it to the user.

With the above described construction, a simple, strong and inexpensive attachment is provided. The supporting and operating arms are pivoted in the runners without the use of separate bolts and the runners are retained on their supports by the front connecting rod which serves as a combined tie rod and step to facilitate the raising of the vehicle from off its wheels. The whole construction avoiding the use of special and expensive castings. It will also be observed, that the runners swing forward to inoperative position, and by pivoting the operating arm intermediate the pivoting points of the supporting arms, it is possible to swing the runners close under the axles when not in use. This almost completely hides the runners when the wheels are in use.

Having thus described my invention what I claim as new and desire to secure by Letters Patent are:

The combination with the axles of a vehicle, of a pair of inverted U-shaped supporting arms having their horizontal connecting portions pivoted to the undersides of said axles to swing forwardly and being formed at their lower ends with runner supports, an operating arm formed with relatively large notches adjacent its upper end to alternately engage over the rear axle to lock the runners in both a raised and lowered position, the lower free ends of said operating arm being pivoted to said runners intermediate the supporting arms, and a rod rigidly connecting the front ends of said runners to tie them upon their supports and to serve as a step to facilitate the raising of the vehicle.

In testimony that I claim the foregoing I hereunto affix my signature.

MELAS A. BELLIVEAU.

Copies of this patent may be obtained for five cents each, by addressing the "Commissioner of Patents, Washington, D. C."